(12) United States Patent
Marx et al.

(10) Patent No.: US 10,092,944 B2
(45) Date of Patent: Oct. 9, 2018

(54) PROCESS AND DEVICE FOR PRODUCING HOT-FORMED WHEEL NAVES

(71) Applicants: THYSSENKRUPP STEEL EUROPE AG, Duisburg (DE); THYSSENKRUPP SYSTEM ENGINEERING GMBH, Weiperstr (DE); THYSSENKRUPP AG, Essen (DE)

(72) Inventors: Arndt Marx, Mettlach-Orscholz (DE); Müller Christian, Schmelz Hüttersdorf (DE); David Pieronek, Dortmund (DE); Axel Grüneklee, Duisburg (DE); Markus Zörnack, Lake Orion, MI (US)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 281 days.

(21) Appl. No.: 15/103,637

(22) PCT Filed: Dec. 15, 2014

(86) PCT No.: PCT/EP2014/003355
§ 371 (c)(1),
(2) Date: Jun. 10, 2016

(87) PCT Pub. No.: WO2015/090552
PCT Pub. Date: Jun. 25, 2015

(65) Prior Publication Data
US 2016/0318091 A1    Nov. 3, 2016

(30) Foreign Application Priority Data
Dec. 17, 2013   (DE) .................. 10 2013 114 245

(51) Int. Cl.
B21D 53/26  (2006.01)
B60B 3/02   (2006.01)
(Continued)

(52) U.S. Cl.
CPC ............... B21D 53/26 (2013.01); B60B 3/00 (2013.01); B60B 3/02 (2013.01); B60B 27/065 (2013.01);
(Continued)

(58) Field of Classification Search
CPC .. B21D 53/26; B60B 3/00; B60B 3/02; B60B 27/065; B60B 2310/226; B60B 2310/213;
(Continued)

(56) References Cited

U.S. PATENT DOCUMENTS 4,819,472 A   4/1989   Daudi
4,897,909 A   2/1990   LaVoy
(Continued)

FOREIGN PATENT DOCUMENTS

CN   1198693 A   11/1998
CN   1863615 A   11/2006
(Continued)

OTHER PUBLICATIONS

English language Abstract for CN 1863615 A listed above.
(Continued)

*Primary Examiner* — Moshe Wilensky
(74) *Attorney, Agent, or Firm* — thyssenkrupp North America, Inc.

(57) ABSTRACT

A method for producing a wheel disk of a vehicle wheel may involve producing the wheel disk produced from a steel blank by hot forming. The blank may be at least partially hardened, preferably press-hardened, during or after the hot forming. The blank may be hot formed using at least one punch and at least one die, and at least one opening may be
(Continued)

Figure 1:
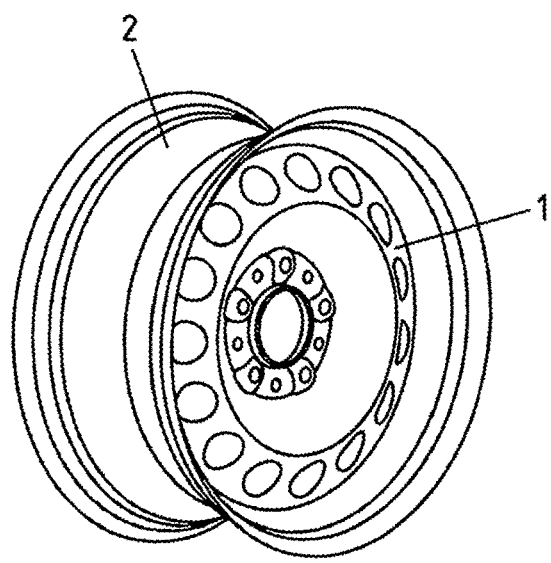

introduced into the blank using hot trimming means. At least one opening may be introduced during the hot trimming using at least one trimming bolt and an application bolt, wherein the application bolt may have at least one region having a cross-sectional shape that is variable in a longitudinal direction of the application bolt. Using the application bolt, the at least one opening may be calibrated via the variable cross sectional shape.

9 Claims, 5 Drawing Sheets

(51) Int. Cl.
  *B60B 3/00* (2006.01)
  *B60B 27/06* (2006.01)
(52) U.S. Cl.
  CPC ... *B60B 2310/206* (2013.01); *B60B 2310/208* (2013.01); *B60B 2310/211* (2013.01); *B60B 2310/212* (2013.01); *B60B 2310/213* (2013.01); *B60B 2310/226* (2013.01); *B60B 2310/228* (2013.01); *B60B 2310/234* (2013.01); *B60B 2310/54* (2013.01); *B60B 2360/102* (2013.01); *B60B 2900/111* (2013.01); *B60B 2900/112* (2013.01); *B60B 2900/311* (2013.01); *B60B 2900/331* (2013.01); *Y02T 10/86* (2013.01)
(58) Field of Classification Search
  CPC ........ B60B 2310/212; B60B 2310/208; B60B 2310/206
  See application file for complete search history.

(56) References Cited

U.S. PATENT DOCUMENTS

| | | |
|---|---|---|
| 2006/0284474 A1 | 12/2006 | Bluemel |
| 2007/0175037 A1 | 8/2007 | Coleman et al. |
| 2007/0175038 A1 | 8/2007 | Jacke et al. |
| 2013/0283616 A1 | 10/2013 | Arns |

FOREIGN PATENT DOCUMENTS

| | | |
|---|---|---|
| CN | 101394954 A | 3/2009 |
| CN | 102284608 A | 12/2011 |
| DE | 103 23 833 A1 | 12/2004 |
| DE | 10 2006 044 269 A1 | 4/2008 |
| DE | 11 2007 000 239 T5 | 12/2008 |
| DE | 10 2011 054 865 A1 | 5/2013 |
| DE | 10 2011 117 066 A1 | 5/2013 |
| JP | H06 61336 U | 8/1994 |
| JP | 2003 126935 A | 5/2003 |

OTHER PUBLICATIONS

English language Abstract of JP2003 126935A.
English language machine translation of JPH06 61336U.
English language Abstract of DE 10 2011 117 066 A1.
English language Abstract of DE 10 2006 044 269 A1.
International Search Report for PCT/EP2014/003355 dated Mar. 3, 2015 (dated Mar. 11, 2015).
English language Abstract for CN 102284608 A listed above.
English language Abstract for CN1198693 A listed above.

PROCESS AND DEVICE FOR PRODUCING HOT-FORMED WHEEL NAVES

CROSS REFERENCE TO RELATED APPLICATIONS

This application is a U.S. National Stage Entry of International Patent Application Serial Number PCT/EP2014/003355, filed Dec. 15, 2014, which claims priority to German Patent Application No. DE 102013114245.1 filed Dec. 17, 2013, the entire contents of both of which are incorporated herein by reference.

FIELD

The present disclosure relates to wheel disks that can be used with vehicle wheels and methods for forming wheel disks from steel blanks by hot forming.

BACKGROUND

The wheels of a motor vehicle are safety-critical components and therefore have to be able to permanently withstand the high fluctuating mechanical loads during operation. Conventional steel wheels consist of a wheel disk, which ensures the connection to the wheel hub, and a wheel-rim band, which holds the tire. Wheel disks are manufactured nowadays by cold forming on multistage presses with up to eleven stages. Use is made here almost exclusively of cold-formable, micro-alloyed dual-phase steels with a strength of 400 to 600 MPa. Aside from the service life of the steel wheels, weight plays an essential role, which has an effect in particular on the material costs, the unsprung masses, rotational inertia and therefore also on the fuel consumption. In principle, materials of higher strength, for example of higher vibration resistance, may be used. However, with increasing strength of the steel materials, the degree of formability of the material generally decreases, and therefore the lightweight construction potential of cold-formable materials appears to be exhausted. Through the use of hot forming, it is possible to comply with the requirements for high formability while the resulting components at the same time have very high strength and dimensional accuracy. During the hot forming, blanks are preferably heated to a temperature at which the forming behavior significantly improves. For example, a significant improvement in the forming is achieved during structural conversion into an austenitic structure. For this purpose, the blanks have to be heated to a temperature above the $A_{c1}$ temperature point, which depends on the composition of the steel. Owing to the greater forming capability of the material during the hot forming, in particular if the steel material has an austenitic structure, a significant reduction in the number of forming steps required in the cold forming can be achieved. In this connection, as many forming or process steps as possible can be shifted into the tool, and therefore subsequent operations can be dispensed with. However, it is problematic that diverse perforations which cannot be introduced into the blank prior to the hot forming have to be provided during the production of wheel disks. Up to now, said perforations have had to be introduced after the hardening and tempering of the components, but in the case of material thicknesses of, for example, more than 3 mm, this can take place only by means of laser cutting. As a rule, the openings in the wheel disk, for example wheel bolt holes, have to have a high dimensional accuracy, and therefore these holes cannot be introduced prior to the hot forming. Furthermore, a standardized geometry for receiving the wheel bolts is also required. The introduction of the holes into the wheel disk after the hot forming is associated with a considerable outlay. This applies, for example, to subsequent laser cutting of the holes or because of the substantial wear involved in subsequent mechanical trimming.

Laid-open application DE 103 23 833 A1 which goes back to the applicant discloses the production of a wheel disk from a tempering steel, for example a manganese-boron steel of the 22MnB5 type, by hot forming. The production of a sheet metal component, which is hardened at least in regions, from a sheet metal blank, with at least one opening having a protruding collar is furthermore known from German laid-open application DE 10 2011 117 066 A1.

In some examples, the present disclosure concerns a method for producing a wheel disk of a vehicle wheel, with which a wheel disk can be produced highly precisely in a simple manner such that the wheel disk accomplishes a further reduction in weight and the required geometries and safety requirements. The present disclosure further concerns apparatuses for carrying out methods such as that identified in the example above.

According to a first teaching of the present invention, the object indicated is achieved in a method for producing a wheel disk of a vehicle wheel in that at least one opening is introduced during the hot trimming using at least one trimming bolt and an application bolt, wherein the application bolt has at least one region having a cross-sectional shape which is variable in the longitudinal direction of the application bolt, and, using the application bolt, the at least one opening is calibrated via the variable cross-sectional shape.

It has turned out that, during the hot forming, even the trimming of the blank in order to introduce openings into the hot-formed wheel disk brings about a significant reduction in the tool wear during the hot trimming, and therefore mechanical trimming of the wheel disk is possible with low costs and outlay. Furthermore, by means of an application bolt having a variable cross-sectional shape at least in regions, the introduced openings can be calibrated immediately after the trimming. Use can also be made here of the fact that the calibration also takes place in a hot state, i.e. at high temperatures, for example at temperatures above the Ms starting point, which is dependent on the composition of the steel, and requires lower forces. Massive formings and calibration can take place at the same time in the opening regions with the use of the application bolt. Massive forming is understood here as meaning, for example, upsetting or forging.

Owing to the fact that the sheet metal thicknesses of the initial blanks are, for example, within the range of 1 mm to 7 mm, preferably in the range of 2 mm to 5 mm, further savings on weight can be achieved. Smaller sheet metal thicknesses can be achieved by selecting a material having a higher strength. In particular when manganese-boron steels, what are referred to as tempering steels, are used, the hot forming gives rise to the possibility at the same time of achieving at least a hardening or press hardening in regions, and therefore the finished wheel disk has the highest strength at a low weight. The hot trimming and the hot forming are preferably finished here before the actual press hardening.

According to a first refinement of the method according to the invention, using at least one trimming bolt and at least one application bolt, wheel bolt holes, ventilation holes in the wheel disk and/or the wheel hub opening are/is introduced during the hot trimming. All three openings have to meet the highest accuracy requirements and must not be susceptible to cracking. With the method according to the invention there is the option to subject in particular the cut edge regions of the openings to massive forming, and therefore the risk of cracking in the opening region is reduced. In addition, particularly smooth opening edges can be achieved by the massive forming without finishing work.

The outlay for producing a wheel disk is further reduced by the fact that the hot forming and the hot trimming of the blank to provide the wheel disk take place in one working stroke. In particular, the use according to the invention of trimming bolts and application bolts permits the method to be carried out in one working step or working stroke.

According to a further refinement of the method according to the invention, use is made of at least one hollow application bolt into which an assigned trimming bolt enters during the hot trimming. Firstly, a particularly wearproof cut edge can thereby be provided by the application bolt. Secondly, there is a possibility of transporting away the trimmed material. In addition, a hollow application bolt and a correspondingly assigned trimming bolt permit the coupling of trimming, for example, to the movement of the punch and/or die.

According to a further refinement of the method, the cut edges of the openings are at least partially formed by massive forming. For example, the required geometries of the wheel bolt holes, which are countersunk conically or spherically, can be produced in a simple manner by at least partial massive forming. In addition, corresponding opening edges reduce the risk of cracking in the opening regions and ensure the necessary rigidity in the opening.

If, according to a next variant, the hot trimming takes place by cutting out the trimmed material downward, gravity can be used for easily transporting away the trimmed material.

According to a further refinement, the movement paths of the at least one trimming bolt and of the at least one application bolt are coupled to the movement path of the punch and/or of the die such that simple forced guidance means can be used in the apparatus for the hot forming of the blank in order to ensure the movement paths of the trimming bolt and of the at least one application bolt in a simple manner.

As an alternative thereto, it is at least partially possible, for example, for the movement paths of the at least one trimming bolt and of the at least one application bolt to be activated separately from the movement paths of the punch and/or of the die. The activation can take place, for example, hydraulically, pneumatically or servo-electrically and to this extent permits greater flexibility with respect to the time and the tool position for carrying out the hot trimming. According to a further refinement of the method, the blank to be formed is particularly preferably cut in such a manner that the hot forming with integrated hot trimming can be carried out to provide the wheel disk, without using holding-down means. By this means, the forming forces during the hot forming are further reduced since the material intake during the forming is minimized.

Finally, according to a further embodiment of the method, a blank composed of a manganese-boron steel, a multiphase steel or a multilayered steel composite material is hot-formed to provide the wheel disk. Manganese-boron steels, and also other tempering steels, can be press hardened after the hot forming such that particularly high strengths are achieved. This also applies to multiphase steels and correspondingly hardenable or press-hardenable steel composite materials.

According to a further teaching of the present invention, the indicated object is achieved by an apparatus for producing a wheel disk in that at least one trimming bolt and at least one assigned application bolt are provided, wherein the application bolt has at least one region having a cross-sectional shape which is variable in the longitudinal direction of the application bolt, and means are provided for calibrating the openings using the region having the variable cross-sectional shape of the application bolt.

As already explained previously, by means of the apparatus provided for the hot forming and having the integrated trimming and application bolts, simultaneous hot forming and trimming of the blank or of the hot-formed wheel disk are achieved, and therefore, in addition to reduced forming forces, highly precise openings in the wheel disk can also be produced at the same time. Forced guidance means, for example, can be provided as the means for calibrating the openings using the region of variable cross-sectional shape of the application bolt, said forced guidance means, during the closing process of the apparatus and the retraction of the punch into the die, permitting a corresponding movement of the application bolt.

At least one application bolt is preferably of hollow design such that the assigned trimming bolt can enter the application bolt. By means of the entry of the trimming bolt into the application bolt, the movement of the trimming bolt and of the application bolt in the tool can be realized in a simple manner via simple forced guidance means. In particular, in the case of this configuration, advantages are also afforded with respect to carrying out the hot forming of the blank to provide the wheel disk and the hot trimming in a single working cycle. For example, the application bolt can provide a high-strength cut edge since the application bolt, which is of hollow design, has, for example, particularly high rigidity.

If at least one trimming bolt is arranged in such a manner that the latter enters an assigned application bolt from above, the trimmed material of the blank produced by the trimming bolt can be removed from the region of the apparatus via the assigned application bolt. In particular, gravity can automatically transport the trimmed material here out of the region of the apparatus.

Finally, means can be provided for the coupled movement control of trimming bolts and application bolts with the movement path of the punch and/or of the die, or means can be provided for the separate movement control of trimming bolts, application bolts, punch and/or die. The coupled movement control, for example via forced guidance means, improves the process reliability by means of the particularly simple configuration of the movement control of trimming bolts, application bolts and punch and/or die. On the other hand, the alternative, of providing a separate movement control of trimming bolts, application bolts, punch and/or die, gives rise to greater flexibility with regard to the adjustment of specific working steps during the production of the wheel disk. The times at which the trimming bolt enters, for example, the application bolt or else trimming takes place by means of the punch can be controlled separately.

FIG. 1 first of all illustrates, in a schematic view, a typical vehicle wheel which is constructed from a wheel disk 1 and a wheel-rim band 2. The wheel disk 1 is connected in an integrally bonded manner to the wheel-rim band 2 and transmits the forces of the wheel hub to the wheel-rim band 2.

Figure 2:
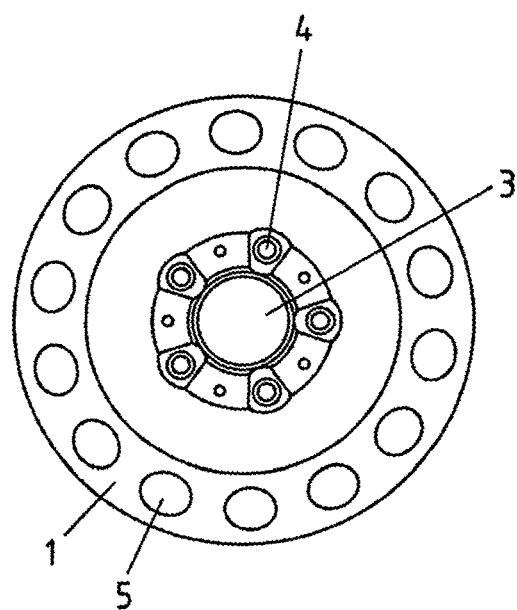

FIG. 2 shows the wheel disk 1 in a front view. Three different openings which the wheel disk 1 has can be seen.

First of all, the wheel hub opening 3 is provided centrally and is surrounded by a total of five wheel bolt openings 4, which are arranged concentrically. Ventilation holes 5 which are necessary for ventilating the brakes are then additionally provided in the outer region of the wheel disk. The wheel hub opening 3, the wheel bolt openings 4 and the ventilation openings 5 have to be introduced extremely precisely into the wheel disk since otherwise, if dimensional tolerances are exceeded, the wheel disk 1 causes problems, for example unbalances, during the use in the vehicle wheel.

Figure 3:
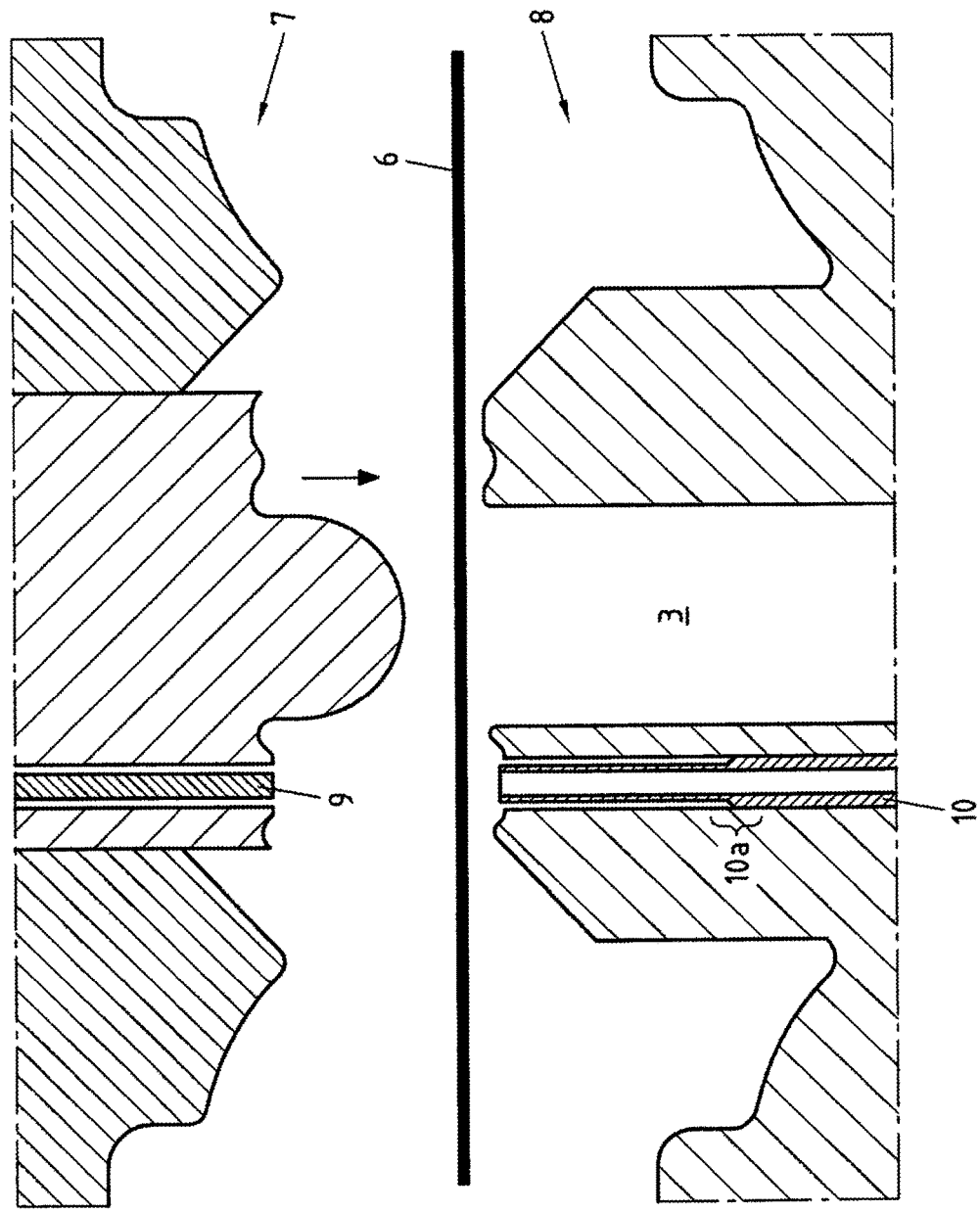
Figure 4:
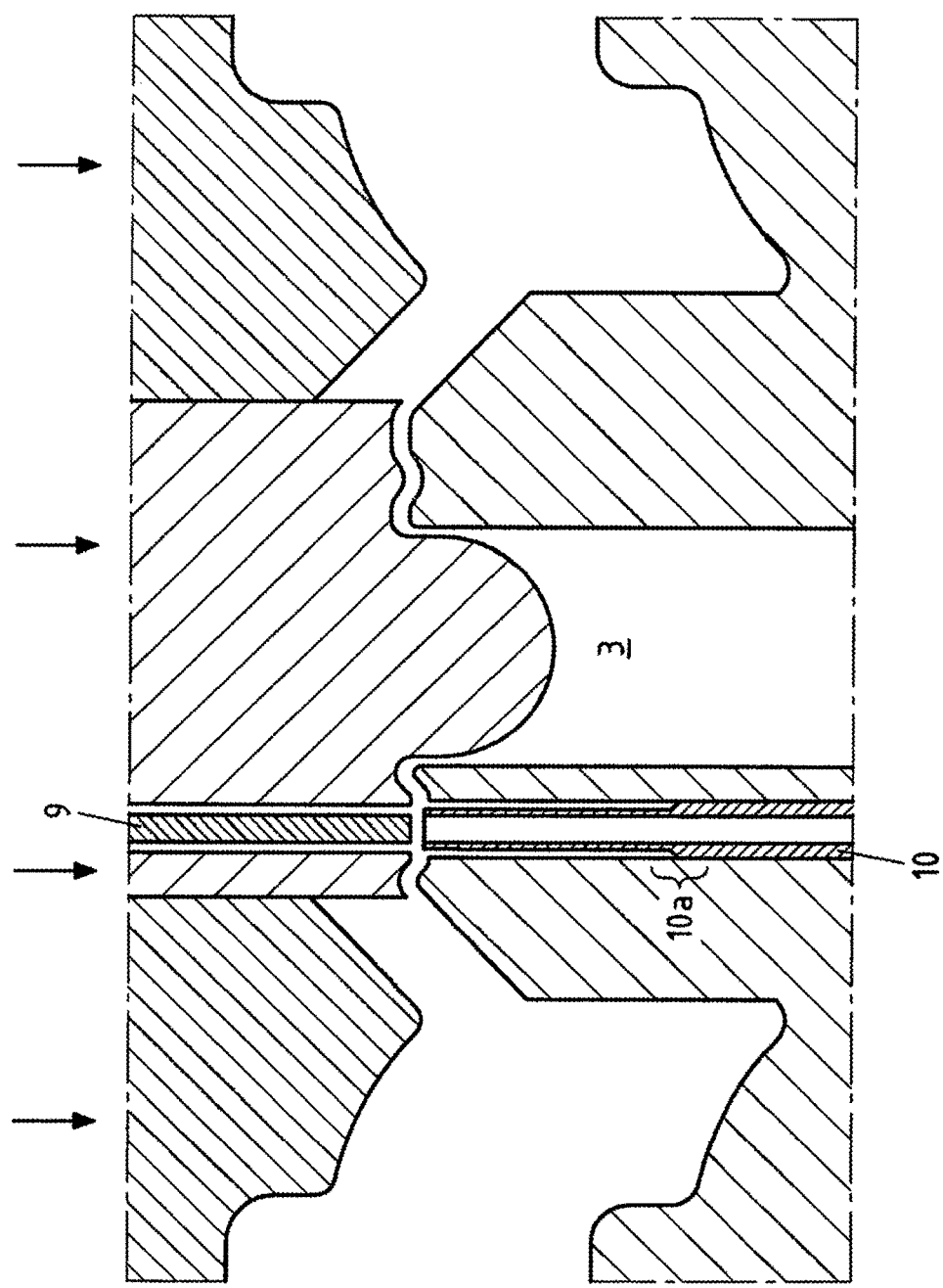
Figure 5:
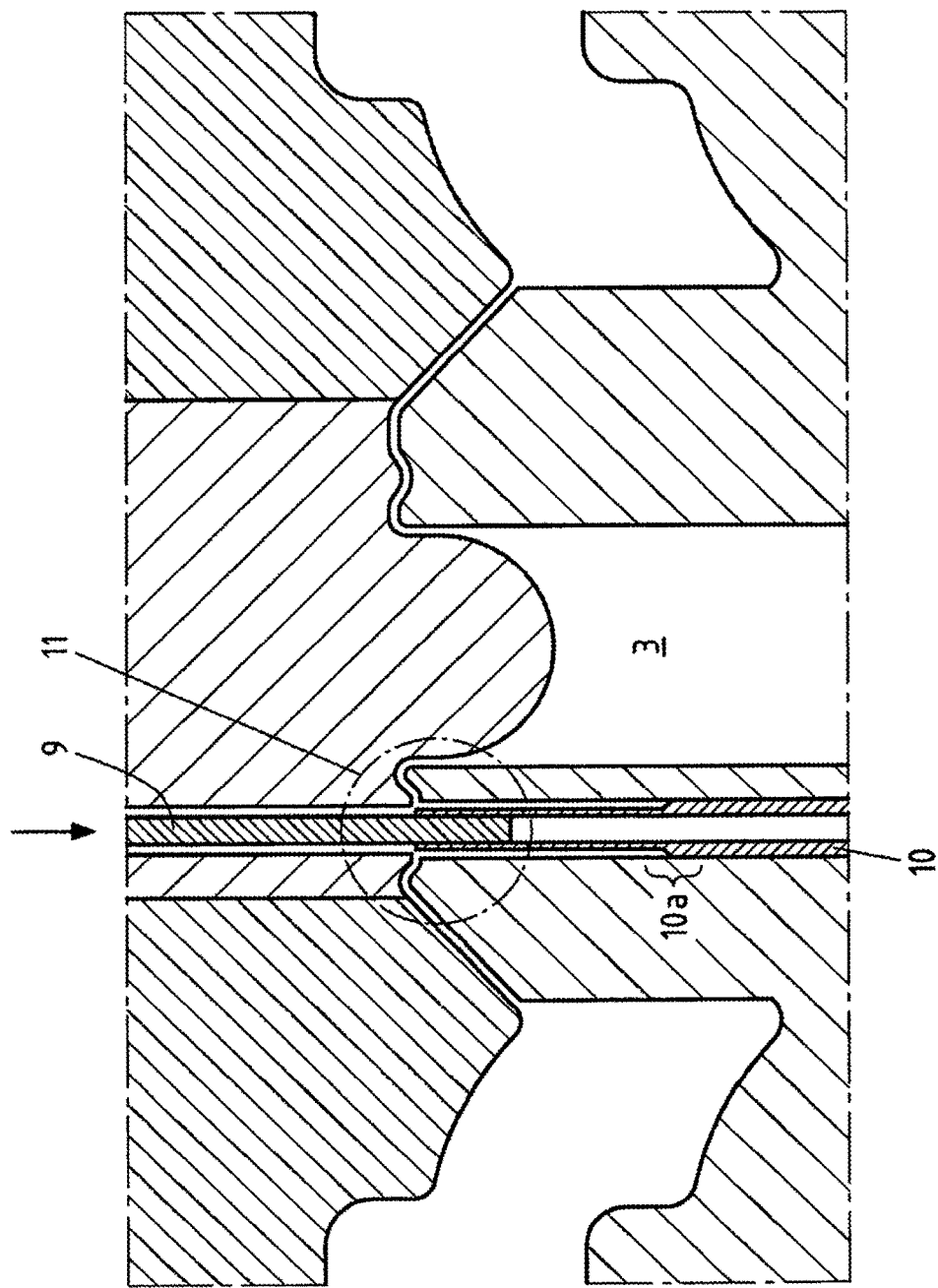

FIGS. 3, 4 and 5 then show the method for producing a wheel disk of a vehicle wheel at three different times, wherein, for the sake of simplicity, the blank 6 is only illustrated in FIG. 3. The blank 6 is heated, for example, to a temperature above the $A_{c1}$ temperature point of the material and placed into the apparatus illustrated in FIG. 3. In this state, an austenitic structure which has a positive influence on the degree of formability is predominantly present. The apparatus comprises a punch 7 and a die 8, with which the blank 6 is hot-formed. The hot forming generally takes place at high temperatures, i.e. when the blank has, for example, an austenitic structure which ensures the preferred forming conditions.

FIG. 3 furthermore shows a trimming bolt 9 and an application bolt 10, the application bolt 10 is of hollow design and has a region 10a in which the cross-sectional shape of the application bolt 10 changes. Over the course of the method, as illustrated in FIG. 4, the punch 7 enters the openings provided by the die 8, and therefore, for example, the axle receiving opening 3 of the wheel disk is punched out. In FIG. 4, the trimming bolt 9 rests, for example, on the blank and does not yet cut the latter. However, this trimming time may in principle be selected more or less freely. The trimming bolt 9 is then introduced into the application bolt 10, and the blank 6, which is not illustrated in FIG. 4 and FIG. 5, is trimmed in the region such that a wheel bolt opening arises. In FIG. 5, for example, the trimming bolt has entered the application bolt. The application bolt 10 furthermore has a region 10a which has a variable cross-sectional shape. The cross section of the application bolt thus increases vertically downward in this region.

Figure 6:
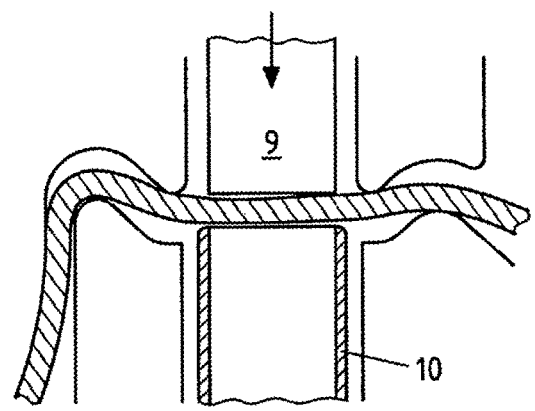
Figure 7:
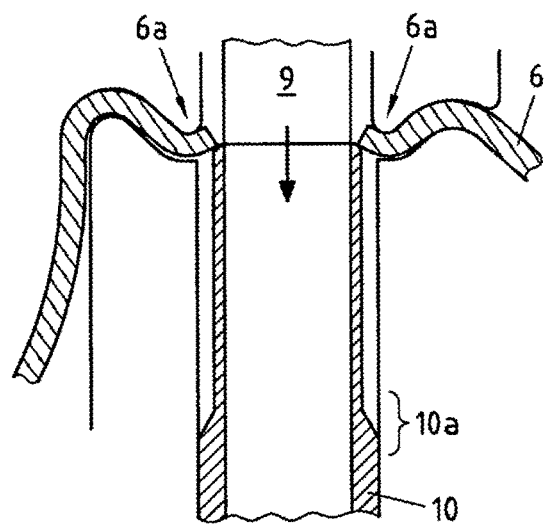
Figure 8:
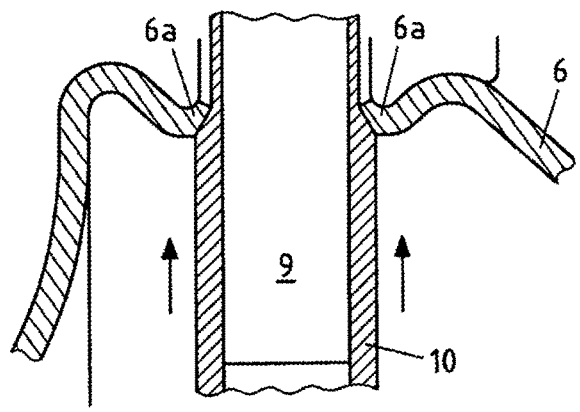

The actual hot trimming during the hot forming of the formed blank 6 will be explained in more detail in FIGS. 6 to 8. FIGS. 6 to 8 show the trimming region 11 from the apparatus illustrated in FIGS. 3 to 5 in an enlarged excerpt.

FIG. 6 shows the trimming bolt 9, the hot-formed blank 6 and the application bolt 10 from the exemplary embodiment from FIG. 3 to FIG. 5. At the time of the method which is illustrated in FIG. 6, the trimming bolt is arranged on the blank 6 and is moved further in the direction of the application bolt. As illustrated in FIG. 7, the trimming bolt enters, for example, the application bolt 10 and transports the trimmed material from the forming region through the application bolt. The trimming bolt conveys the trimmed material of the blank 6 preferably in the direction of gravity downward out of the forming region. After the trimming of the opening, the application bolt 10 is moved vertically upward such that the region with the variable cross-sectional shape 10a calibrates the opening in the blank 6. For example, as illustrated in FIG. 8, during the calibration the opening region can be thickened, or conical or spherical countersunk portions can be formed. For example, the edge 6a of the opening region of the blank 6 can be thickened. By means of the thickening or smoothing of the surface of the cut edge, the opening obtains greater strength and resistance to cracking. Furthermore, further requirements imposed on the rigidity of the wheel disk can also be brought about by massive forming, for example forging or upsetting, via the variable cross-sectional shape of the application bolt. In addition, the remaining regions of the die or of the punch 7 can contribute to massive forming during the calibration of the openings.

The blank 6 preferably has a thickness of 2 mm to 7 mm, particularly preferably of 3 mm to 5 mm. Greater wall thicknesses may also be required for wheel disks which are provided for truck wheels.

With the method principle illustrated in FIGS. 6 to 8, not only can the wheel bolt openings 4 of the wheel disk 1 be introduced, but so too can the central wheel hub opening and the ventilation holes in the wheel disk. As can likewise be seen with reference to FIGS. 6 to 8, the hot forming and the hot trimming of the blank 6 preferably take place in one working step.

The means for controlling the movement paths of the trimming bolt, of the application bolt and of the punch and of the die are not illustrated in FIGS. 3 to 5 and 6 to 8. However, it is easily conceivable for the time of the trimming or of the calibration of the individual opening to be able to be selected in a highly flexible manner in the case of separate activation of the movement paths of the trimming bolt, the application bolt and of the punch and the die. For the particularly simple control of the movement paths of the trimming bolt, the application bolt and of the punch and the die, simple coupled activation means, for example forced guidance means, can also be provided. The latter are extremely robust and can nevertheless provide highly precise movement paths.

Owing to the high temperature of the blank to be formed, the forming forces during the hot forming and during the hot trimming are relatively low in relation to the subsequent strength of the wheel disk, for example with press hardening in regions. In this respect, further weight saving potentials can be realized by the wheel disk produced by the method according to the invention without dispensing with a relatively simple and cost-effective manner of production.

What is claimed is:

1. A method for producing a wheel disk, the method comprising: hot forming a steel blank using a punch and a introducing an opening into the steel blank using hot trimming means, wherein the opening is introduced during hot trimming by using a trimming bolt and an application bolt having a longitudinal axis and a region having a cross-sectional shape that is variable in the longitudinal direction of the application bolt; calibrating the opening using the variable cross-sectional shape of the application bolt; and hardening the steel blank at least partially during or after the hot forming, wherein the application bolt is hollow and the trimming bolt enters the application bolt during the hot trimming.

2. The method of claim 1 further comprising introducing during the hot trimming at least one of wheel bolt holes, ventilation holes, or a wheel hub opening by using the at least one trimming bolt and the application bolt.

3. The method of claim 1 wherein the hot forming and the hot trimming of the steel blank occur in one working stroke.

4. The method of claim 1 wherein a cut edge of the opening introduced into the steel blank is at least partially formed by massive forming.

5. The method of claim 1 wherein the hot trimming comprises cutting out trimmed material downward.

6. The method of claim 1 wherein movement paths of the trimming bolt and the application bolt are coupled to a movement path of at least one of the punch or the die.

7. The method of claim 1 wherein movement paths of the trimming bolt and the application bolt are independent of at least one of a movement path of the die or a movement path of the punch.

8. The method of claim 1 further comprising cutting the steel blank in such a manner that the hot forming with integrated hot trimming is performed to produce the wheel disk without using a holding-down means.

9. The method of claim 1 wherein the steel blank comprises a manganese-boron steel, a multiphase steel, or a multilayered steel composite material.

* * * * *